United States Patent [19]

Sacher

[11] 4,454,964
[45] Jun. 19, 1984

[54] ADJUSTABLE STROKE DISPENSING PUMP

[75] Inventor: Robert F. Sacher, Walnut, Calif.

[73] Assignee: Calmar, Inc., City of Industry, Calif.

[21] Appl. No.: 315,899

[22] Filed: Oct. 28, 1981

[51] Int. Cl.³ .......................... B67D 5/22; G01F 11/06
[52] U.S. Cl. ...................................... 222/43; 222/309; 222/321
[58] Field of Search ....................... 222/41, 43, 47, 48, 222/49, 50, 309, 321, 383

[56] References Cited

U.S. PATENT DOCUMENTS

| | | | |
|---|---|---|---|
| 1,724,766 | 8/1929 | McCauley | 222/321 |
| 3,020,938 | 2/1962 | Ballin . | |
| 3,101,751 | 8/1963 | Ballin . | |
| 3,216,625 | 11/1965 | Corsette . | |
| 3,458,090 | 7/1969 | Scoggin . | |
| 3,492,876 | 2/1970 | Bull et al. | 222/309 |
| 3,802,608 | 4/1974 | Gullett . | |
| 4,051,983 | 10/1977 | Anderson . | |
| 4,111,367 | 9/1978 | Hayes | 222/321 |

*Primary Examiner*—H. Grant Skaggs
*Attorney, Agent, or Firm*—Watson, Cole, Grindle & Watson

[57] ABSTRACT

An arrangement for adjusting the inward pressure stroke of a reciprocable pump plunger operating in a pump cylinder mounted on a closure cap of a hand-operated pump, includes confronting limit stops on the plunger head and on the closure cap, with one of the stops having stop portions at differing axial distances relative to the plunger, and the other stop having a portion at a fixed axial distance relative to the plunger. The confronting stop portions are individually and selectively engageable with one another for adjusting the pressure stroke of the plunger to thereby vary the output.

3 Claims, 5 Drawing Figures

U.S. Patent    Jun. 19, 1984    4,454,964
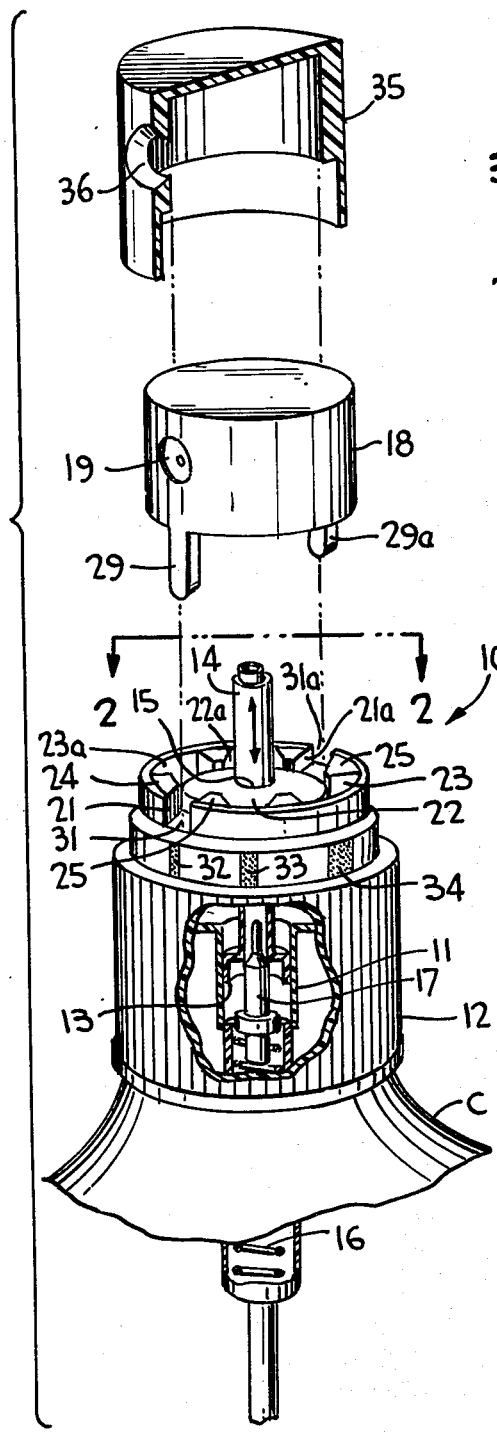
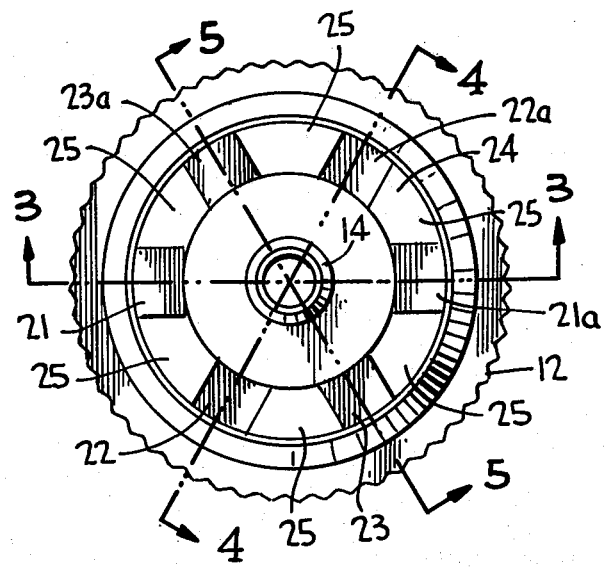
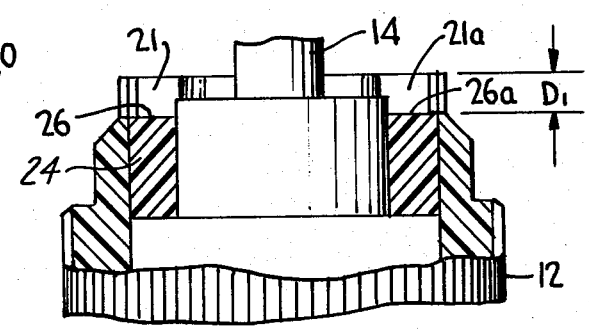
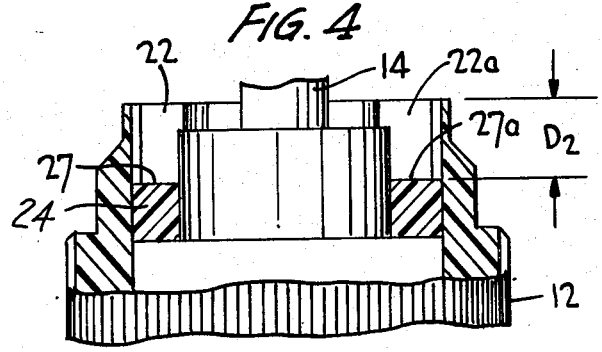
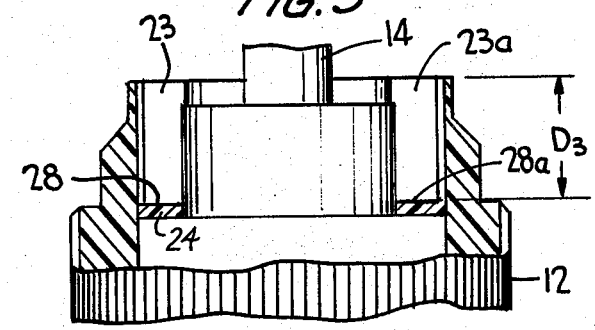

ADJUSTABLE STROKE DISPENSING PUMP

BACKGROUND OF THE INVENTION

This invention relates generally to an atomizing dispensing pump and other type dispensers, and more particularly to an arrangement for adjusting the inward pressure stroke of the pump plunger applied to a portable liquid container or bottle.

In dispensers, especially of the finger-actuated type for atomizing expensive perfumes, colognes and other personal care products, there is a growing need to control the output both for conservation purposes and for limiting the amount of discharge. And, for other dispensers used in dispensing flowable products, it would also be desireable to control the amount of discharge to avoid product waste and to limit the volume of discharge during each application.

Dispensers of this latter type have been devised for restricting the plunger stroke to permit pre-selection of measured quantities of liquid to be dispensed, by restricting the plunger stroke. However, such known prior arrangements are cumbersome and costly, and are only capable of restricting the plunger stroke to the same extent during each reciprocating movement. For example, the Corsette U.S. Pat. No. 3,216,625 discloses an overcap having an inwardly directed shoulder or projection for limiting downward plunger movement as it abuts against an outwardly projecting radial rib provided on the closure cap. And, the Scoggin U.S. Pat. No. 3,458,090 discloses an adjustable stroke fluid dispenser which includes the use of a clip surrounding the plunger for limiting its suction stroke. In such arrangements, however, the metering of dispensed liquid cannot be varied between different strokes without changing the overcap or substituting different clips.

In the Ballin U.S. Pat. Nos. 3,020,938 and 3,101,751, on the other hand, variable metering means is disclosed although for the entirely different purpose of predetermining the number of drops of liquid which can be drawn into the tube of a medicine dropper, or ejected from the dropper.

SUMMARY OF THE INVENTION

It is therefore an object of the present invention to provide a pump dispenser having a variable restricted plunger stroke for simply and effectively dispensing different amounts of material during plunger reciprocation.

Another object of the invention is to provide such a dispenser wherein a spring biased plunger extending outwardly of a closure cap is restricted during its inward pressure stroke to a predetermined extent by the provision of a limit stop on the cap having stop portions located st differing axial differences relative to the plunger, and a limit stop on the plunger confronting the stop portions for individually and selectively engaging same to thereby adjust the pressure stroke and vary the output.

A further object of the present invention is to provide such a dispenser wherein the limit stop on the plunger comprises an abutment leg, and the stop portions on the closure cap are separated and are identified by indicia means in the form of markings graduated in width.

Other objects, advantages and novel features of the invention will become more apparent from the following detailed description of the invention when taken in conjunction with the accompanying drawings.

BRIEF DESCRIPTION OF THE DRAWINGS

FIG. 1 is an expanded perspective view of a dispenser and plunger head incorporating the invention;

FIG. 2 is a top plan view, at a slightly enlarged scale, of the stop portion provided on the closure cap, taken substantially along the line 2—2 of FIG. 1;

And FIGS. 3, 4 and 5 are cross-sectional views showing the stop portions located at differing axial distances relative to the plunger taken substantially along the lines 3—3, 4—4, and 5—5, respectively, of FIG. 2.

DETAILED DESCRIPTION OF THE INVENTION

Turning now to the drawings wherein like reference characters refer to like and corresponding parts throughout the several views, a pump sprayer 10, generally of the type disclosed in the Anderson U.S. Pat. No. 4,051,983, is shown in FIG. 1 mounted on a container C of product to be dispensed. As in the Anderson patent, commonly owned herewith, the pump comprises a pump cylinder 11 mounted on an internally threaded closure cap 12, a piston 13 formed at one end of a hollow plunger 14 operating in the cylinder between inward pressure and outward suction strokes for the dispensing of liquid product. An end of the plunger extends outwardly through a central opening 15 in the closure cap, and a return spring resiliently urges the plunger upwardly. A poppet valve 17 contains an inlet ball check, is engaged by the return spring at one end and has a valve stem at its other end forming a discharge valve.

It should be pointed out that dispensers having an outwardly extending reciprocable plunger, other than the type disclosed in FIG. 1, are likewise capable of incorporating the invention to variably limit the plunger stroke to vary the output.

A plunger head 18 has a central collar (not shown) extending downwardly from the inside of the top wall thereof, and a discharge passage extending radially therefrom and terminating in a discharge orifice 19, similarly as in the aforementioned U.S. Pat. No. 4,051,983. The plunger head is press-fitted onto the outer end of the hollow plunger so that, upon application of finger pressure to the head, the plunger is reciprocated in the direction of the double arrows of FIG. 1 for the dispensing of liquid product.

In accordance with the invention, the upper end of the closure cap is provided with a plurality of coaxial grooves 21, 22, 23 and 21a, 22a, 23a equally spaced apart along the periphery of a ring 24. Grooves 21a, 22a, 23a respectively oppose grooves 21, 22, 23, and all the grooves are spaced apart by truncated separators 25, as more clearly shown in FIG. 2. And, bottom ends 26 and 26a, 27 and 27a, 28 and 28a of the respective opposing grooves are located at different axial distances relative to the plunger, as shown in FIGS. 3, 4 and 5. Thus, bottom ends 26, 27 and 28 are respectively spaced from the upper edge of ring 24 different distances D1, D2 and D3. And, these bottom ends together constitute a limit stop on the closure cap having stop portions at the aforedescribed differing axial distances relative to the plunger as measured from the upper edge of ring 24.

A pair of opposed, axially extending legs 29, 29a depending from a lower edge of the plunger head are in axial alignment with a selected one of an opposed pair of grooves upon a selected orientation of the plunger head relative to the closure cap. The terminal ends of these legs 29 define limit stops or abutment portions engageable with a selected pair of opposing bottom ends of the grooves for limiting the extent of the downward pressure stroke applied to the plunger.

The length of legs 29 and 29a are such as to permit a short downward reciprocating movement of the plunger, as limited upon engagement with limit stop portions 26 and 26a, with the plunger head oriented in the position of FIG. 1. Cutouts 31 and 31a may be provided in ring 24 adjacent grooves 21 and 21a for identifying the shortest plunger stroke for the benefit of the operator. And, the plunger is rotatable about its central axis relative to the closure cap to thereby facilitate rotary movement of the plunger head press-fitted thereto from a selected relative position of FIG. 1, to selected positions whereby legs 29 are axially aligned with grooves 22, 22a or with grooves 23, 23a. Thus, in these different selected positions relative to opposed pairs of grooves, the downward extent of the pressure stroke of the plunger is adjusted from distance D1 to distance D2 to distance D3. And with the plunger in its full upstroke position, the terminal ends of legs 29, 29a are of sufficient length to abut against the top surfaces of separators 25 when the legs are out of alignment with any of the grooves. Thus, the plunger may be locked into its upper position against reciprocation to thereby prevent leakage in conditions of non-use as during storage and/or shipping.

Indicia in the form of markings 32, 33, 34 graduated in width, may be provided on the outer surface of the closure cap in association with respective grooves 21, 22, 23 as an aid in selecting the extent of product discharge during a dispensing operation.

An overcap 35 may be pressed-fitted over the plunger head for movement therewith. At the end of the longest pressure stroke (i.e., with legs 24 aligned with grooves 23), the skirt of the overcap overlies the upper wall of the closure cap on which the indicia is located, to thereby avoid any interference during plunger reciprocation. And, an opening 36 in the overcap is in alignment with discharge orifice 19 to permit product discharge without interference.

Thus, in operation, the overcap is turned to rotatably move the plunger head into alignment between legs 29, 29a and one of the opposed pairs of grooves as selected by the operator depending on the volume of the product discharge intended. Markings 32, 33, 34 permit the operator to quickly choose between a small, medium or large volume of discharge for a particular dispensing operation. Downward plunger stroke is varied, depending on the selected orientation of the plunger head, as the terminal ends of legs 29, 29a engage one of an opposed pair of bottom ends of the grooves. And, in a non-use position of storage and/or shipping, the plunger head may be simply rotated until legs 29, 29a overlie the top surfaces of an opposing pair of separators 25 for locking the plunger in an upward position.

Obviously, many modifications and variations of the present invention are made possible in the light of the above teachings. For example, only one set of grooves 21, 22, 23 may be provided together with a single depending leg 29, and at least two and more than three pairs of opposing grooves, having bottom walls lying at different positions relative to the plunger, may be provided without departing from the invention. Also, upstanding legs such as 29 may be provided on the closure cap and the selectively aligned grooves may be provided on the plunger head, in keeping with the invention. It is therefore to be understood that within the scope of the appended claims the invention may be practiced otherwise than as specifically described.

What is claimed is:

1. An adjustable stroke dispensing pump, comprising a closure cap adapted to be secured to a container of flowable product to be dispensed, end wall means on said cap including a central hub having a central opening, a piston and cylinder unit secured to said cap and including a spring biased hollow plunger extending outwardly through said central opening and being rotatable about the central axis thereof, said cap having an integral, annular extension surrounding said hub and concentric with said plunger, a separate ring concentric with said plunger and being mounted between said hub and said annular extension, said ring having circumferentially spaced, inwardly opening axial grooves therein defining ring segments therebetween, said grooves and said ring segments lying along a circle concentric to said central axis, said grooves having bottom ends defining limit stops located at different axial distances relative to said plunger and being located inwardly of an upper surface of said ring, a plunger head containing a discharge passage frictionally engaging an outer terminal end of said plunger for rotation together therewith about said central axis, at least one axially extending leg depending from a lower edge of said plunger head in axial alignment with said circle so as to be thereby in axial alignment with a selected one of said grooves and a selected one of said ring segments upon a selected rotative orientation of said head relative to said cap, said leg having an outer surface flush with the outer surface of said plunger head, a terminal end of said leg defining an abutment in engagement with one of said ring segments when said head is selectively rotated relative to said cap for preventing plunger reciprocation during conditions of storage and/or non-use, said abutment engaging one of said limit stops for varying the output of product from the container when said head is selectively rotated to align said leg with said selected one of said grooves.

2. The pump according to claim 1, wherein opposed pairs of said grooves are spaced at different axial distances relative to said plunger, and a pair of opposed axially extending legs having outer surfaces flush with said outer surface of said head and depending an equal distance from said lower edge of said head.

3. The pump according to claim 1, wherein indicia comprising markings graduated in width are provided on said cap in association with said grooves for identifying said limit stops located at said different axial distances relative to said plunger.

* * * * *